(12) United States Patent (10) Patent No.: US 11,917,170 B2
Kang et al. (45) Date of Patent: *Feb. 27, 2024

(54) IMAGE INFORMATION DECODING METHOD, IMAGE DECODING METHOD, AND DEVICE USING SAME

(71) Applicant: Electronics and Telecommunications Research Institute, Daejeon (KR)

(72) Inventors: Jung Won Kang, Daejeon (KR); Ha Hyun Lee, Seoul (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,248

(22) Filed: Sep. 22, 2022

(65) Prior Publication Data

US 2023/0035462 A1 Feb. 2, 2023

Related U.S. Application Data

(63) Continuation of application No. 17/144,409, filed on Jan. 8, 2021, now Pat. No. 11,483,578, which is a (Continued)

(30) Foreign Application Priority Data

Apr. 16, 2012 (KR) .................... 10-2012-0038870
Jun. 21, 2012 (KR) .................... 10-2012-0066606
(Continued)

(51) Int. Cl.
*H04N 19/187* (2014.01)
*H04N 19/70* (2014.01)
(Continued)

(52) U.S. Cl.
CPC ......... *H04N 19/187* (2014.11); *H04N 19/124* (2014.11); *H04N 19/13* (2014.11);
(Continued)

(58) Field of Classification Search
CPC .... H04N 19/124; H04N 19/13; H04N 19/182; H04N 19/187; H04N 19/188;
(Continued)

(56) References Cited

U.S. PATENT DOCUMENTS 7,415,069 B2 8/2008 Wiger
8,711,931 B2 4/2014 Tanaka et al.
(Continued)

FOREIGN PATENT DOCUMENTS

CN 1666195 A 9/2005
CN 101120593 A 2/2008
(Continued)

OTHER PUBLICATIONS

Amon, Peter, et al. "File Format For Scalable Video Coding." IEEE Transactions on Circuits and Systems for Video Technology 17.9 (2007): 1174-1185. (12 pages, in English).
(Continued)

*Primary Examiner* — Christopher S Kelley
*Assistant Examiner* — Ana Picon-Feliciano
(74) *Attorney, Agent, or Firm* — Michael Best & Friedrich LLP

(57) ABSTRACT

The present invention relates to an image information decoding method. The decoding method includes receiving a bit stream including a Network Abstraction Layer (NAL) unit that includes information related to encoded image, and parsing a NAL unit header of the NAL unit. The NAL unit header may not include 1 bit flag information that represents
(Continued)

whether a picture is a non-reference picture or a reference picture in the entire bit stream during encoding.

3 Claims, 5 Drawing Sheets

Related U.S. Application Data continuation of application No. 16/784,714, filed on Feb. 7, 2020, now Pat. No. 10,958,919, which is a continuation of application No. 14/391,061, filed as application No. PCT/KR2013/003204 on Apr. 16, 2013, now Pat. No. 10,602,160.

(30) Foreign Application Priority Data

| | | |
|---|---|---|
| Jun. 25, 2012 | (KR) | 10-2012-0067925 |
| Jul. 2, 2012 | (KR) | 10-2012-0071933 |
| Jul. 16, 2012 | (KR) | 10-2012-0077012 |
| Sep. 28, 2012 | (KR) | 10-2012-0108925 |
| Oct. 10, 2012 | (KR) | 10-2012-0112598 |
| Apr. 16, 2013 | (KR) | 10-2013-0041862 |

(51) Int. Cl.
| | |
|---|---|
| *H04N 19/61* | (2014.01) |
| *H04N 19/30* | (2014.01) |
| *H04N 19/31* | (2014.01) |
| *H04N 19/46* | (2014.01) |
| *H04N 19/169* | (2014.01) |
| *H04N 19/124* | (2014.01) |
| *H04N 19/13* | (2014.01) |
| *H04N 19/52* | (2014.01) |
| *H04N 19/593* | (2014.01) |
| *H04N 19/80* | (2014.01) |
| *H04N 19/91* | (2014.01) |
| *H04N 19/182* | (2014.01) |
| *H04N 19/33* | (2014.01) |
| *H04N 19/503* | (2014.01) |

(52) U.S. Cl.
CPC ......... *H04N 19/182* (2014.11); *H04N 19/188* (2014.11); *H04N 19/30* (2014.11); *H04N 19/31* (2014.11); *H04N 19/46* (2014.11); *H04N 19/52* (2014.11); *H04N 19/593* (2014.11); *H04N 19/61* (2014.11); *H04N 19/70* (2014.11); *H04N 19/80* (2014.11); *H04N 19/91* (2014.11); *H04N 19/33* (2014.11); *H04N 19/503* (2014.11)

(58) Field of Classification Search
CPC ........ H04N 19/30; H04N 19/31; H04N 19/33; H04N 19/46; H04N 19/503; H04N 19/52; H04N 19/593; H04N 19/61; H04N 19/70; H04N 19/80; H04N 19/91
USPC .................................................. 375/240.12
See application file for complete search history.

(56) References Cited

U.S. PATENT DOCUMENTS

| | | | |
|---|---|---|---|
| 8,855,200 | B2 | 10/2014 | Koo et al. |
| 9,131,245 | B2 | 9/2015 | Chen et al. |
| 9,179,157 | B2 | 11/2015 | Zhu et al. |
| 9,332,254 | B2 | 5/2016 | Wang et al. |
| 10,595,026 | B2 | 3/2020 | Kang et al. |
| 10,602,160 | B2 * | 3/2020 | Kang .................. H04N 19/13 |
| 10,958,918 | B2 | 3/2021 | Kang et al. |
| 10,958,919 | B2 * | 3/2021 | Kang .................. H04N 19/187 |
| 11,483,578 | B2 * | 10/2022 | Kang .................. H04N 19/593 |
| 2001/0001614 | A1 | 5/2001 | Boice et al. |
| 2003/0231769 | A1 | 12/2003 | Bolle et al. |
| 2006/0165182 | A1 | 7/2006 | Kukuchi |
| 2006/0188225 | A1 | 8/2006 | Yamakage et al. |
| 2007/0086516 | A1 | 4/2007 | Lee et al. |
| 2007/0086521 | A1 | 4/2007 | Wang et al. |
| 2009/0097573 | A1 | 4/2009 | Choi et al. |
| 2009/0175353 | A1 | 7/2009 | Suh et al. |
| 2010/0098157 | A1 | 4/2010 | Yang |
| 2010/0129052 | A1 | 5/2010 | Fujinami et al. |
| 2010/0142613 | A1 | 6/2010 | Zhu |
| 2010/0158116 | A1 | 6/2010 | Jeon et al. |
| 2010/0158133 | A1 | 6/2010 | Yin et al. |
| 2010/0208735 | A1 | 8/2010 | Wiegand |
| 2010/0226227 | A1 | 9/2010 | Yu et al. |
| 2011/0064146 | A1 | 3/2011 | Chen et al. |
| 2011/0082945 | A1 | 4/2011 | Myers et al. |
| 2012/0013746 | A1 | 1/2012 | Chen et al. |
| 2012/0183077 | A1 | 7/2012 | Hong et al. |
| 2012/0230409 | A1 | 9/2012 | Chen et al. |
| 2012/0230431 | A1 | 9/2012 | Boyce et al. |
| 2013/0114743 | A1 | 5/2013 | Sjoberg et al. |
| 2013/0136176 | A1 | 5/2013 | Chen et al. |
| 2013/0182755 | A1 | 7/2013 | Chen et al. |
| 2013/0215975 | A1 | 8/2013 | Samuelsson et al. |

FOREIGN PATENT DOCUMENTS

| | | |
|---|---|---|
| CN | 101180883 A | 5/2008 |
| CN | 101218828 A | 7/2008 |
| CN | 101292538 A | 10/2008 |
| CN | 101317459 A | 12/2008 |
| CN | 101390400 A | 3/2009 |
| CN | 101401433 A | 4/2009 |
| CN | 101444102 A | 5/2009 |
| CN | 101449585 A | 6/2009 |
| CN | 101455084 A | 6/2009 |
| CN | 101485208 A | 7/2009 |
| CN | 101536533 A | 9/2009 |
| CN | 101569197 A | 10/2009 |
| CN | 101578867 A | 11/2009 |
| CN | 101641954 A | 2/2010 |
| CN | 101653002 A | 2/2010 |
| CN | 101658038 A | 2/2010 |
| CN | 101841708 A | 9/2010 |
| CN | 101889448 A | 11/2010 |
| CN | 102065319 A | 5/2011 |
| EP | 1578136 A2 | 9/2005 |
| EP | 1773063 A1 | 4/2007 |
| EP | 2200295 A1 | 6/2010 |
| EP | 3086556 A1 | 10/2016 |
| JP | 2007208917 A | 8/2007 |
| JP | 2010-516085 A | 5/2010 |
| JP | 2014-530571 A | 11/2014 |
| JP | 2016-146636 A | 8/2016 |
| JP | 2016-174384 A | 9/2016 |
| JP | 2016-174385 A | 9/2016 |
| JP | 6186026 B2 | 8/2017 |
| JP | 2018-152864 A | 9/2018 |
| JP | 2018-152865 A | 9/2018 |
| JP | 2018-152866 A | 9/2018 |
| JP | 2018-152867 A | 9/2018 |
| JP | 2018-152868 A | 9/2018 |
| JP | 2018-152873 A | 9/2018 |
| JP | 2018-152874 A | 9/2018 |
| JP | 6553245 B2 | 7/2019 |
| JP | 6556903 B2 | 8/2019 |
| KR | 10-2006-0068254 A | 6/2006 |
| KR | 10-0596706 B1 | 7/2006 |
| KR | 10-2006-0122664 A | 11/2006 |
| KR | 10-2007-0074503 A | 7/2007 |
| KR | 10-0763196 B1 | 10/2007 |
| KR | 10-2008-0007086 A | 1/2008 |
| KR | 10-2008-0066784 A | 7/2008 |
| KR | 10-2009-0021136 A | 2/2009 |
| KR | 10-2009-0037689 A | 4/2009 |
| KR | 10-2009-0045323 A | 5/2009 |
| KR | 10-2009-0079932 A | 7/2009 |

(56) References Cited

FOREIGN PATENT DOCUMENTS

| | | |
|---|---|---|
| KR | 10-2011-0019955 A | 3/2011 |
| KR | 10-2011-033240 A | 3/2011 |
| KR | 10-2012-0015260 A | 2/2012 |
| WO | WO2005/055608 A1 | 6/2005 |
| WO | WO2006/080561 A2 | 8/2006 |
| WO | WO2006/126841 A1 | 11/2006 |
| WO | WO2006/134110 A1 | 12/2006 |
| WO | WO2007/042914 A1 | 4/2007 |
| WO | WO2007/046633 A1 | 4/2007 |
| WO | WO2007/081150 A1 | 7/2007 |
| WO | 2008/042259 A2 | 4/2008 |
| WO | WO2008/047303 A3 | 4/2008 |
| WO | WO2008/085013 A1 | 7/2008 |
| WO | WO2008/105389 A1 | 9/2008 |
| WO | WO2010/011295 A1 | 1/2010 |
| WO | WO2011/052215 A1 | 5/2011 |
| WO | WO2012/122176 A1 | 9/2012 |
| WO | WO2013/043887 | 3/2013 |
| WO | WO2013/043913 A1 | 3/2013 |
| WO | WO2013/082517 A1 | 6/2013 |
| WO | WO2013/106705 A2 | 7/2013 |
| WO | WO2013/153227 A2 | 10/2013 |
| WO | WO2014/046812 A2 | 3/2014 |
| WO | WO2014/046813 A2 | 3/2014 |
| WO | WO2014/098703 A1 | 6/2014 |
| WO | WO2014/162739 A1 | 10/2014 |

OTHER PUBLICATIONS

Argyriou et al. "Streaming H. 264/AVC video over the internet." Consumer Communications and Networking Conference, 2004. CCNC 2004. First IEEE. IEEE, 2004.

Boyce et al. "High level syntax hooks for future extensions." Joint Collaborative Team on Video Coding (JCT-VC) document JCTVC-H0388, 8th Meeting: San Jose, CA, USA. 2012.

Bross, Benjamin et al., "High efficiency video coding (HEVC) text specification draft 6", Joint Collaborative Team on Video Coding (JCT-VG) of ITU-T SG16 WP3 and /SOI/EC JTC11SC29/WG11, 8th Meeting: San Jose, California, USA, Feb. 1-10, 2012 (259 pages in English).

Feng et al. "A scalable video codec for layered video streaming." Real-Time Imaging 10.5, 2004.

Jill Boyce et al., "Information for scalable extension high layer syntax," Joint Collaborative Team on Video Coding (JCT-VG) of ITU-T SG16 WP3 and ISO/IEC JTC1/SC29/WG11, 8th Meeting: San Jose, CA, USA, Feb. 2012, Document: JCTVC-H0386r2, pp. 1-8.

Jill Boyce et al., "Parameter Sets Modifications for Temporal Scalability and Extension Hooks", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012 (Document: JCTVC-10230v3).

Jill Boyce et al., "SEI message for sub-bitstream profile & level indicators," Joint Collaborative Team on Video Coding (JCT-VG) of ITU-T SG 16 WP 3 and ISO/IEC JTC 1/SC 29/WG 11, 9th Meeting: Geneva, CH, Apr. 2012, Document: JCTVC-10231, pp. 1-7.

Jung Won Kang et al., "On NAL unit header," Joint Collaborative Team on Video Coding (JCT-VC) of ITU-T SG 16 WP 3 and ISO/IEC JTC 1/SC 29/WG 11, 9th Meeting: Geneva, CH, Apr. 2012, JCTVC-10251, pp. 3.

Jung Won Kang et al., "Simple NAL Unit Header for HEVC,"(JCTVC-H0410), JCT-VC of ITU-T SG 16 WP 3 and ISO/IEC JTC 1/SC29/WG11, 8th Meeting: San Jose, USA, Feb. 1-10, 2012 (5 pages, in English).

Miska M. Hannuksela et al., "H.264/AVC Video for Wireless Transmission", IEEE Wireless Communications, IEEE Service Center, Piscataway, NJ, US, vol. 12, No. 4, Aug. 1, 2005 (Aug. 1, 2005), pp. 6-13, XP011137994, ISSN: 1536-1284.

Miska M. Hannuksela, et al., "Indication of the temporal structure of coded video sequences," Proceedings of the 8th Meeting of the Joint Collaborative Team on Video Coding (JCT-VG) of ITU-T SG 16 WP3 and ISO/IEC JTCI/SC29/WG 11, San Jose, CA, USA, Feb. 1-10, 2012, pp. 1-5.

Schwarz et al. "Overview of the scalable video coding extension of the H. 264/AVC standard." Circuits and Systems for Video Technology, IEEE Transactions on Sep. 17, 2007.

Segall, "On the requirements for bit-depth and chroma format scalability," 26. JVT Meeting; 83. MPEG Meeting; Jan. 13, 2008-Jan. 18, 2008; Antalya, (Joint Video Team of ISO/IEC JTC1/SC29/WG11 and ITU-T SG.16), No. JVT-Z036, Jan. 15, 2008 XP030007325.

Sjoberg et al. "Overview of HEVC high-level syntax and reference picture management." Circuits and Systems for Video Technology, IEEE Transactions on Dec. 22, 2012.

Specification from U.S. Appl. No. 61/507,388, filed Jul. 13, 2011.

TK Tan and Junya Takiue, "On nal_ref_flag," Joint Collaborative Team on Video Coding (JCT-VC) of ITU-T SG 16 WP 3 and ISO/IEC JTC 1/SC 29/WG 11, 10th Meeting: Stockholm, SE, Jul. 2012, JCTVC-J0231r1, pp. 1-3.

Truong Cong Thang et al., "AHG 9 / AHG 10:On NAL unit header," Joint Collaborative Team on Video Coding (JCT-VC) of ITU-T SG 16 WP 3 and ISO/IEC JTC 1/SC 29/WG 11, 10th Meeting: Stockholm, SE, Jul. 2012, JCTVC-J0174, pp. 1-4.

Truong Cong Thang et al., "High level syntax for future scalable extension", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012 (Document: JCTVC-10253) (Year: 2012).

Truong Cong Thang et al., "High-Level Syntax Modifications to Support Extractor Operation", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012 (Document: JCTVC-10252).

Truong Cong Thang et al., "Signaling of VPS Activation", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, XP002722600 (Document: JCTVC-J0261 r1).

Truong Cong Thang et al., "Signaling of VPS Activation", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, XP030112623 (Document: JCTVC-J0261).

Truong et al., "On NAL Unit Header," (JCTVC-10251 ), JCT-VC of ITU-T SG16 WP3 and ISO/IEC JTC 1/SC 29/WG11 9th Meeting: Geneva, CH, (Apr. 27-May 7, 2012), (3 pages, in English).

Wang et al. "System and transport interface of SVC." Circuits and Systems for Video Technology, IEEE Transactions on Sep. 17, 2007.

Wang et al., "MV-HEVC/SHVC HLS: VPS and SPS designs in HEVC 3DV and scalable extensions," 4.JCT-3V Meeting; Apr. 20, 2013-Apr. 26, 2013;Incheon; (The Joint Collaborative Team on 30 Video Coding Extension Development of ISO/IEC JTC1/SC29/WG11 and ITU-T SG.16) 2013, XP030130711.

Wiegand et al. "WD3: Working draft 3 of high-efficiency video coding." JCT-VC 5th Meeting, JCTVC-E603. 2011.

Ye-Kui Wang and Ying Chen, "High-level syntax hook for HEVC multi-standard extensions," Joint Collaborative Team on Video Coding (JCT-VC) of ITU-T SG 16 WP 3 and ISO/IEC JTC 1/SC 29/WG 11, 9th Meeting: Geneva, CH, Apr. 2012, JCTVC-10355, pp. 1-5.

Ye-Kui Wang and Zhenyu Wu, "On NAL unit header," Joint Collaborative Team on Video Coding (JCT-VC) of ITU-T SG16 WP3 and ISO/IEC, JTC1/SC29/WG11, 4th Meeting: Daegu, KR, Jan. 2011, JCTVC-D080, pp. 1-3.

Ye-Kui Wang, "AHG9: High-Level Syntax Clean-Ups", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, XP030113002 (Document: JCTVC-K0120).

Ying Chen and Ye-Kui Wang, "AHG10:High-level syntax hook for HEVC multi-standard extensions," Joint Collaborative Team on Video Coding (JCT-VC) of ITU-T SG 16 WP 3 and ISO/IEC JTC 1/SC 29/WG 11, 10th Meeting: Stockholm, SE, Jul. 2012, JCTVC-J0113, pp. 1-5.

(56) References Cited

OTHER PUBLICATIONS

International Search Report dated Jul. 31, 2013 in counterpart International Application No. PCT/KR2013/003204 (3 pages in English, 4 pages in Korean).
International Search Report dated Jul. 31, 2013 in counterpart International Application No. PCT/KR2013/003206. (7 pages in English, 8 pages, in Korean).
Korean Office Action dated Dec. 2, 2014 in counterpart Korean Patent Application No. 10-2014-0054445 (6 pages, in Korean).
Skupin et al., "Generic HEVC high level syntax for scalability and adaptation," JCTVC-I0217, Joint Collaborative Team on Video Coding (JCT-CV) of ITU-T SG 16 WP 3 and ISO/IEC JTC 1/SC 29/WG 11 9th Meeting: Geneva, CH, Apr. 27-May 7, 2012.
Hannuksela et al., "Hook for scalable extensions: video parameter set," JCTVC-I0524, Joint Collaborative Team on Video Coding (JCT-CV) of ITU-T SG 16 WP 3 and ISO/IEC JTC 1/SC 29/WG 11, 9th Meeting: Geneva, CH, Apr. 27-May 7, 2012.
English Language Translation of KR20120038870, filed Apr. 16, 2012.
English Language Translation of KR20120066606, filed Jun. 21, 2012.
English Language Translation of KR20120067925, filed Jun. 25, 2012.
English Language Translation of KR20120071933, filed Jul. 2, 2012.
English Language Translation of KR20120077012, filed Jul. 16, 2012.
English Language Translation of KR20120108925, filed Sep. 28, 2012.
English Language Translation of KR20120112598, filed Oct. 10, 2012.
Chen et al., "AHG10: Video parameter set HEVC base specification," Joint Collaborative Team on Video Coding (JCT-CV) of ITU-T SG16 WP3 and ISO/IEC JTC1/SC29/WG11 10th Meeting: Stockholm, SE, Jul. 11-20, 2012.
Wang et al., "MV-HEVC/SHVC HLS: On VPS and SPS in HEVC 3DV and scalable extensions," Joint Collaborative Team on Video Coding (JCT-CV) of ITU-T SG16 WP3 and ISO/IEC JTC1/SC29/WG11 4th Meeting: Incheon, KR, Apr. 20-26, 2013.
Wang et al., "AHG12: Video parameter set and its use in 3D-HEVC," Joint Collaborative Team on Video Coding (JCT-CV) of ITU-T SG16 WP3 and ISO/IEC JTC1/SC29/WG11 9th Meeting: Geneva, CH, Apr. 27-May 7, 2012.
Hannuksela et al., "Indication of the temporal structure of coded video sequences," JCTVC-H0423r3, Joint Collaborative Team on Video Coding (JCT-VC) of ITU-T SG16 WP3 and ISO/IEC JTC1/SC29/WG11 8th Meeting: San José, CA, USA, Feb. 1-10, 2012.

\* cited by examiner

IMAGE INFORMATION DECODING METHOD, IMAGE DECODING METHOD, AND DEVICE USING SAME

CROSS-REFERENCE TO RELATED APPLICATIONS

This application is a continuation of U.S. patent application Ser. No. 17/144,409, filed Jan. 8, 2013, which is a continuation of U.S. patent application Ser. No. 16/784,714, filed Feb. 7, 2020, now U.S. Pat. No. 10,958,919, which is a continuation of U.S. patent application Ser. No. 14/391,061, filed Oct. 7, 2014, now granted U.S. Pat. No. 10,602,160, which was a national stage application under 35 USC 371 of International Application No. PCT/KR2013/003204 filed on Apr. 16, 2013, which claims the benefit of Korean Application No. 10-2012-0038870 filed on Apr. 16, 2012, Korean Application No. 10-2012-0066606 filed on Jun. 21, 2012, Korean Application No. 10-2012-0067925 filed on Jun. 25, 2012, Korean Application No. 10-2012-0071933 filed on Jul. 2, 2012, Korean Application No. 10-2012-0077012 filed on Jul. 16, 2012, Korean Application No. 10-2012-0108925 filed on Sep. 28, 2012, Korean Application No. 10-2012-0112598 filed on Oct. 10, 2012, Korean Application No. 10-2013-0041862 filed on Apr. 16, 2013 in the Korean Intellectual Property Office, the entire disclosures of which are incorporated herein by reference for all purposes.

TECHNICAL FIELD

The present invention relates to video encoding and decoding processing and, more particularly, to a method and apparatus for decoding video information within a bit stream.

BACKGROUND ART

As broadcast having High Definition (HD) resolution is extended and served nationwide and worldwide, many users are being accustomed to video having high resolution and high SNR. Accordingly, a lot of organizations have conducted many attempts to develop the next-generation video devices. Furthermore, as there is a growing interest in Ultra High Definition (UHD) having resolution 4 times higher than HDTV along with HDTV, there is a need for technology in which an video having higher resolution and higher SNR is compressed and processed.

In order to compress an video, inter-prediction technology in which a value of a pixel included in a current picture is predicted from temporally anterior and/or posterior pictures, intra-prediction technology in which a value of a pixel included in a current picture is predicted using information about a pixel included in the current picture, entropy encoding technology in which a short code is assigned to a symbol having high frequency of appearance and a long code is assigned to a symbol having low frequency of appearance, etc. can be used.

Video compression technology includes technology in which a specific network bandwidth is provided under the limited operating environment of hardware without taking a flexible network environment into consideration. However, in order to compress video data applied to a network environment including a frequently varying bandwidth, new compression technology is necessary. To this end, a scalable video encoding/decoding method can be used.

DISCLOSURE

Technical Problem

An object of the present invention is to provide a method and apparatus for describing extraction and scalability information within layered bit streams.

Another object of the present invention is to provide a method and apparatus for representing scalability information about a variety of bit streams using in a flexible way.

Yet another object of the present invention is to provide a method and apparatus for providing extraction and scalability information within a layered bit stream so that the extraction and the scalability information can be adaptively transformed in a packet level.

Technical Solution

A method of decoding video information in accordance with an embodiment of the present invention includes receiving a bit stream comprising a Network Abstraction Layer (NAL) unit comprising information related to encoded video and parsing an NAL Unit (NALU) header of the NALU, wherein the NALU header may not include flag information of 1 bit indicating whether the NALU is a non-reference picture or a reference picture in the entire bit stream when encoding the video.

A video decoding method in accordance with an embodiment of the present invention may include decoding a received picture, marking the decoded picture in a Decoded Picture Buffer (DPB) as a reference picture, parsing a slice header for a next picture of the decoded picture, and indicating whether or not the decoded picture is a reference picture or a non-reference picture based on reference picture information included in the slice header.

A method of decoding video information in accordance with another embodiment of the present invention may include receiving a Supplementary Enhancement Information (SEI) message including information about an active parameter set and parsing the information about the parameter set.

Advantageous Effects

In accordance with an embodiment of the present invention, there can be provided a method and apparatus for describing extraction and scalability information within layered bit streams.

In accordance with an embodiment of the present invention, there can be provided a method and apparatus for representing scalability information about a variety of bit streams using in a flexible way.

In accordance with another embodiment of the present invention, there can be provided a method and apparatus for providing extraction and scalability information within layered bit streams so that the extraction and the scalability information can be adaptively transformed in a packet level.

MODE FOR INVENTION

Some exemplary embodiments of the present invention are described in detail with reference to the accompanying drawings. However, in describing the embodiments of this specification, a detailed description of the well-known functions and constitutions will be omitted if it is deemed to make the gist of the present invention unnecessarily vague.

In this specification, when it is said that one element is 'connected' or 'coupled' with the other element, it may mean that the one element may be directly connected or coupled with the other element or a third element may be 'connected' or 'coupled' between the two elements. Furthermore, in this specification, when it is said that a specific element is 'included', it may mean that elements other than the specific element are not excluded and that additional elements may be included in the exemplary embodiments of the present invention or the technical scope of the present invention.

Terms, such as the first and the second, may be used to describe various elements, but the elements are not restricted by the terms. The terms are used to only distinguish one element from the other element. For example, a first element may be named a second element without departing from the scope of the present invention. Likewise, a second element may be named a first element.

Furthermore, element units described in the exemplary embodiments of the present invention are independently shown to indicate difference and characteristic functions, and it does not mean that each of the element units is formed of a piece of separate hardware or a piece of software. That is, the element units are arranged and included, for convenience of description, and at least two of the element units may form one element unit or one element may be divided into a plurality of element units and the plurality of divided element units may perform functions. An embodiment into which the elements are integrated or embodiments from which some elements are separated are also included in the scope of the present invention, unless they depart from the essence of the present invention.

Furthermore, in the present invention, some elements are not essential elements for performing essential functions, but may be optional elements for improving only performance. The present invention may be implemented using only essential elements for implementing the essence of the present invention other than elements used to improve only performance, and a structure including only essential elements other than optional elements used to improve only performance is included in the scope of the present invention.

Figure 1:
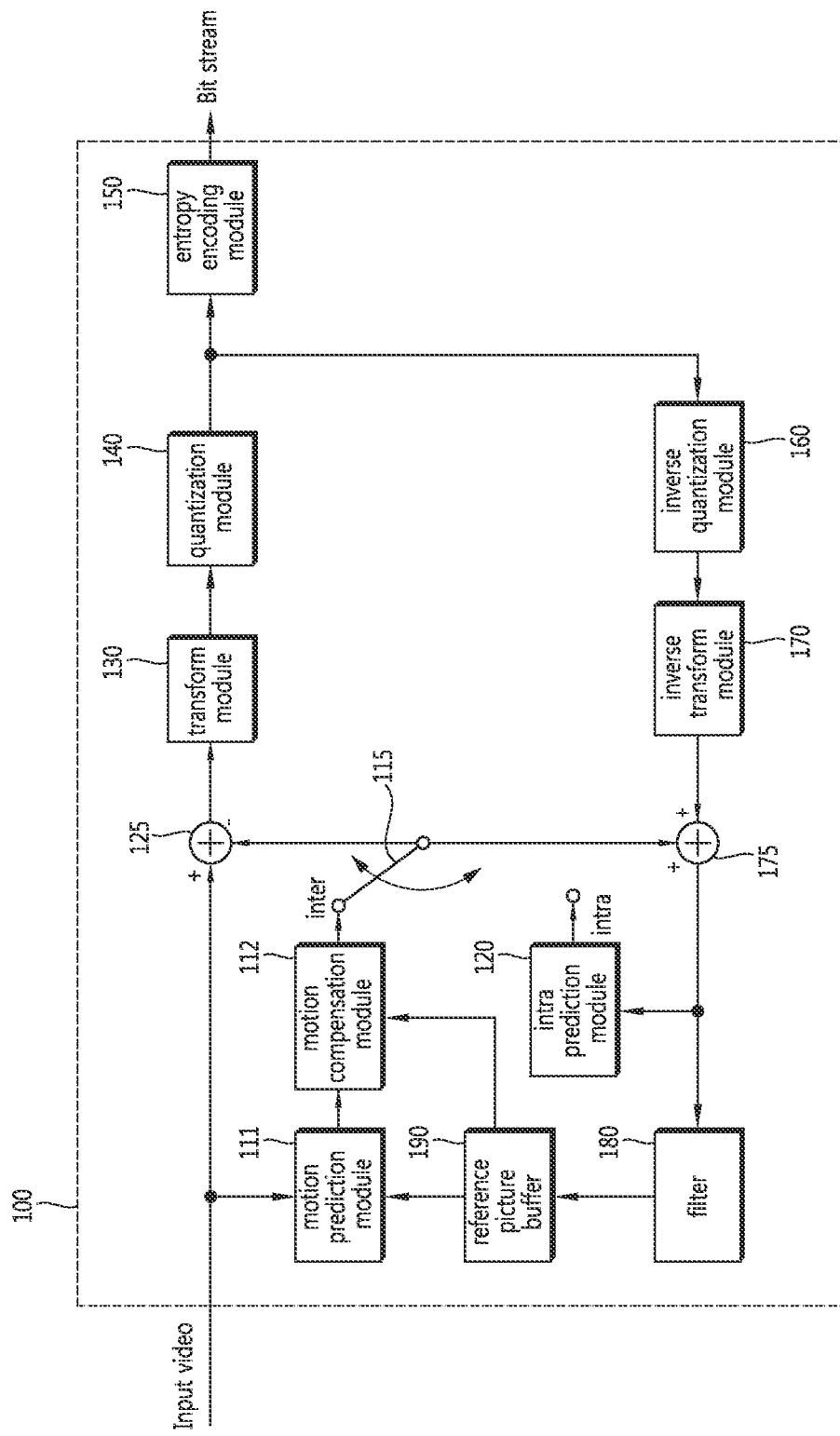
FIG. 1 is a block diagram showing an example of a structure a video encoding apparatus according to an exemplary embodiment.

FIG. 1 is a block diagram showing an example of a structure of a video encoding apparatus according to an exemplary embodiment. A scalable video encoding/decoding method or apparatus can be implemented by an extension of a common video encoding/decoding method or apparatus which do not provide scalability. The block diagram of FIG. 1 shows an exemplary embodiment of a video encoding apparatus which may become a basis for a scalable video encoding apparatus.

Referring to FIG. 1, the video encoding apparatus 100 includes a motion prediction module 111, a motion compensation module 112, an intra-prediction module 120, a switch 115, a subtractor 125, a transform module 130, a quantization module 140, an entropy encoding module 150, a dequantization module 160, an inverse transform module 170, an adder 175, a filter 180, and a reference picture buffer 190.

The video encoding apparatus 100 can perform encoding on an input picture in intra-mode or inter-mode and output a bit stream as a result of the encoding. In this specification intra-prediction has the same meaning as intra-picture prediction, and inter-prediction has the same meaning as inter-picture prediction. In the case of intra-mode, the switch 115 can switch to intra mode. In the case of inter-mode, the switch 115 can switch to inter-mode. The video encoding apparatus 100 can generate a predicted block for the input block of an input picture and then encode the residual between the input block and the predicted block.

In the case of intra-mode, the intra-prediction module 120 can generate the predicted block by performing spatial prediction using pixel values of neighboring blocks, of a current block, which are encoded already.

In the case of inter-mode, the motion prediction module 111 can obtain a motion vector by searching a reference picture, stored in the reference picture buffer 190, for a region that is most well matched with the input block in a motion estimation process. The motion compensation module 112 can generate the predicted block by performing motion compensation using the motion vector and the reference picture stored in the reference picture buffer 190.

The subtractor 125 can generate a residual block based on the residual between the input block and the generated predicted block. The transform module 130 can perform transform on the residual block and output a transform coefficient according to the transformed block. Furthermore, the quantization module 140 can output a quantized coefficient by quantizing the received transform coefficient using at least one of a quantization parameter and a quantization matrix.

The entropy encoding module 150 can perform entropy encoding on symbols according to a probability distribution based on values calculated by the quantization module 140 or encoding parameter values calculated in an encoding process and output a bit stream as a result of the entropy encoding. The entropy encoding method is a method of receiving symbols having various values and representing the symbols in the form of a string of decodable binary numbers while removing statistical redundancy from the symbols.

Here, the symbol refers to a syntax element and a coding parameter to be encoded or decoded, a value of a residual signal, etc. The coding parameter is a parameter necessary for encoding and decoding. The coding parameter can include not only information encoded by an encoder and then delivered to a decoder along with a syntax element, but also information that can be induced in an encoding or decoding process. The coding parameter means information necessary to encode or decode video. The coding parameter can include, for example, value or statistics of intra/inter-prediction mode, a motion vector, a reference picture index, an encoding block pattern, information about whether or not a residual signal is present, a transform coefficient, a quantized transform coefficient, a quantization parameter, a block size, and block partition information. Furthermore, the residual signal can mean a difference between the original signal and a predicted signal. Furthermore, the residual signal may mean a signal obtained by transforming a difference between the original signal and a predicted signal or a signal obtained by transforming and quantizing a difference between the original signal and an predicted signal. The residual signal can be called a residual block in a block unit.

If entropy encoding is used, the size of a bit stream for a symbol to be encoded can be reduced because the symbol is represented by allocating a small number of bits to a symbol having a high appearance frequency and a large number of bits to a symbol having a low appearance frequency. Accordingly, the compression performance of video encoding can be improved through entropy encoding.

For the entropy encoding, encoding methods, such as exponential Golomb, Context-Adaptive Variable Length Coding (CAVLC), and Context-Adaptive Binary Arithmetic Coding (CABAC), can be used. For example, a table for performing entropy encoding, such as a Variable Length Coding/Code (VLC) table, can be stored in the entropy encoding module 150, and the entropy encoding module 150 can perform entropy encoding using the stored VLC table. Furthermore, the entropy encoding module 150 may derive a binarization method for a target symbol and a probability model for a target symbol/bin and perform entropy encoding using the derived binarization method or probability model.

The quantized coefficient is dequantized by the dequantization module 160 and is then inversely transformed by the inverse transform module 170. The dequantized and inversely transformed coefficient can be added to the predicted block through the adder 175, thereby generating a reconstructed block.

The reconstructed block experiences the filter 180. The filter 180 can apply one or more of a deblocking filter, a Sample Adaptive Offset (SAO), and an Adaptive Loop Filter (ALF) to the reconstructed block or the reconstructed picture. The reconstructed block that has experienced the filter 180 can be stored in the reference picture buffer 190.

Figure 2:
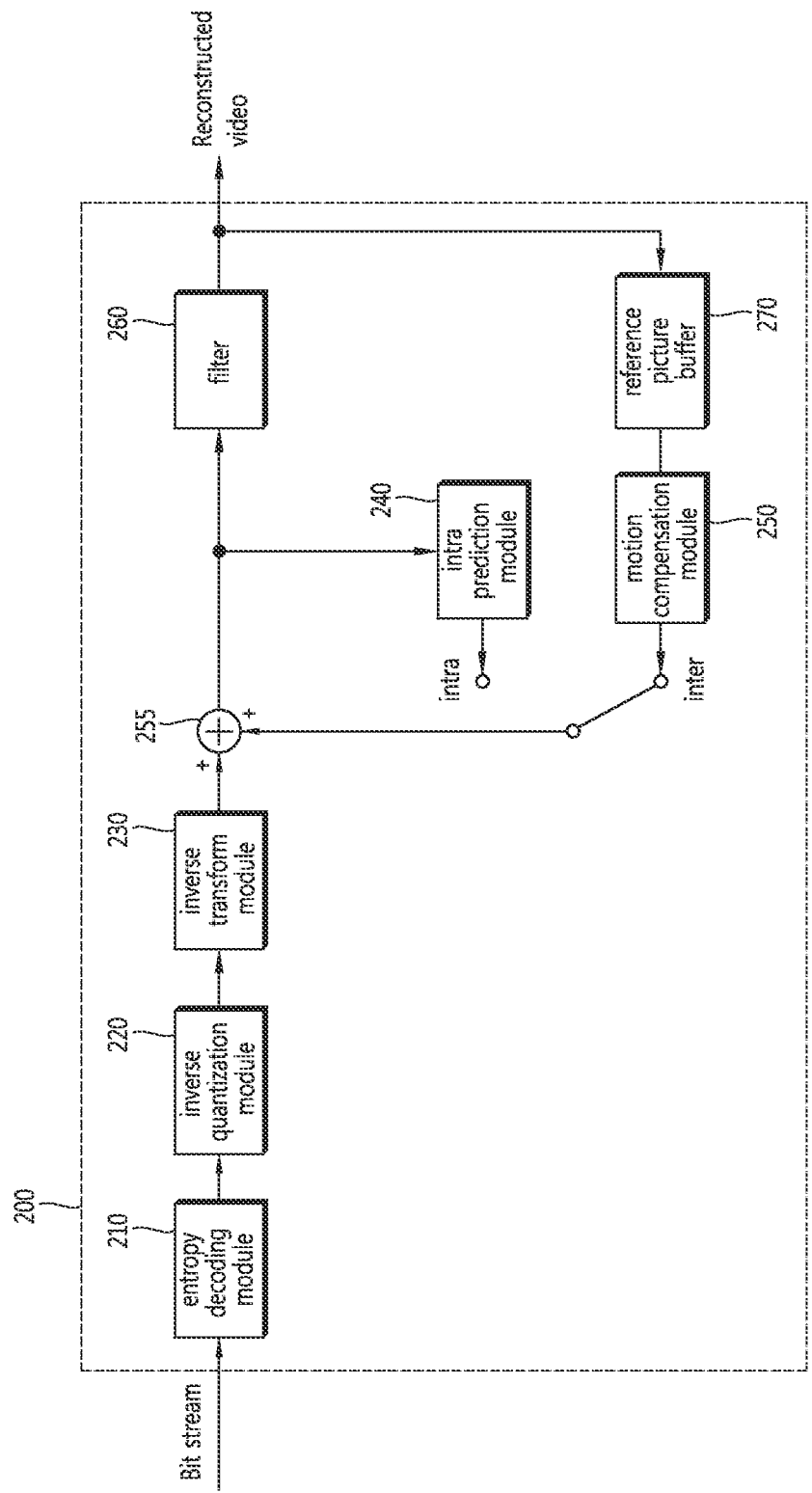
FIG. 2 is a block diagram showing an example of a structure of a video decoding apparatus according to an exemplary embodiment.

FIG. 2 is a block diagram showing an example of a structure of a video decoding apparatus according to an exemplary embodiment. As described above with reference to FIG. 1, a scalable video encoding/decoding method or apparatus can be implemented by an extension of a common video encoding/decoding method or apparatus which does not provide scalability. The block diagram of FIG. 2 shows an exemplary embodiment of a video decoding apparatus which can become a basis for a scalable video decoding apparatus.

Referring to FIG. 2, the video decoding apparatus 200 includes an entropy decoding module 210, an inverse quantization module 220, an inverse transform module 230, an intra-prediction module 240, a motion compensation module 250, a filter 260, and a reference picture buffer 270.

The video decoding apparatus 200 can receive a bit stream outputted from an encoder, perform decoding on the bit stream in intra-mode or inter-mode, and output a reconstructed picture, that is, a reconstructed picture. In the case of intra-mode, a switch can switch to intra-mode. In the case of inter-mode, the switch can switch to inter-mode. The video decoding apparatus 200 can obtain a reconstructed residual block from the received bit stream, generate a predicted block, and then generate a reconstructed block, that is, a reconstructed, by adding the reconstructed residual block to the predicted block.

The entropy decoding module 210 can generate symbols including a symbol having a quantized coefficient form by performing entropy decoding on the received bit stream according to a probability distribution. The entropy decoding method is a method of receiving a string of binary numbers and generating each symbol using the string of binary numbers. The entropy decoding method is similar to the above-described entropy encoding method.

The quantized coefficient is dequantized by the inverse quantization module 220 and is inversely transformed by the inverse transform module 230. As a result of the dequantization/inverse transform of the quantized coefficient, a residual block can be generated.

In the case of intra-mode, the intra-prediction module 240 can generate a predicted block by performing spatial prediction using pixel values of already decoded blocks neighboring the current block. In the case of inter-mode, the motion compensation module 250 can generate a predicted block by performing motion compensation using a motion vector and a reference picture stored in the reference picture buffer 270.

The residual block and the predicted block are added together by an adder 255. The added block experiences the filter 260. The filter 260 can apply at least one of a deblocking filter, an SAO, and an ALF to the reconstructed block or the reconstructed picture. The filter 260 outputs a reconstructed picture, that is, a reconstructed picture. The reconstructed picture can be stored in the reference picture buffer 270 and can be used for inter-frame prediction.

From among the entropy decoding module 210, the inverse quantization module 220, the inverse transform module 230, the intra-prediction module 240, the motion compensation module 250, the filter 260, and the reference picture buffer 270 included in the video decoding apparatus 200, elements directly related to the decoding of video, for example, the entropy decoding module 210, the inverse quantization module 220, the inverse transform module 230, the intra-prediction module 240, the motion compensation module 250, and the filter 260 can be represented as a decoding module in order to distinguish them from other elements.

Furthermore, the video decoding apparatus 200 can further include a parsing module (not shown) for parsing information related to encoded video included in a bit stream. The parsing module may include the entropy decoding module 210, or the parsing module may be included in the entropy decoding module 210. The parsing module may be represented as one of the elements of the decoding module.

Figure 3:
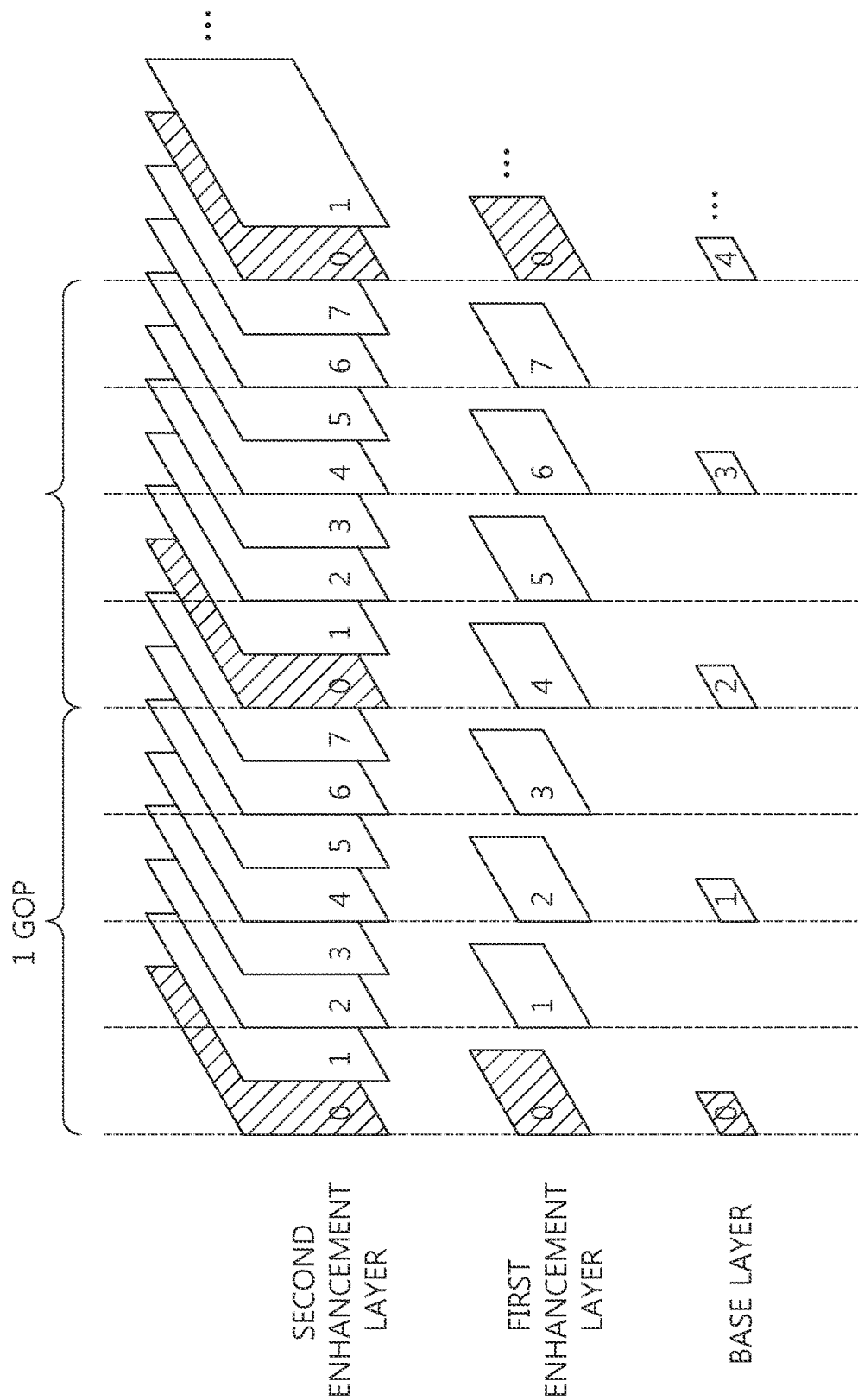
FIG. 3 is a conceptual diagram schematically showing an exemplary embodiment of a Scalable Video Coding (SVC) structure using multiple layers to which the present invention can be applied.

FIG. 3 is a conceptual diagram schematically showing an exemplary embodiment of a Scalable Video Coding (SVC) structure using multiple layers to which the present invention can be applied. In FIG. 3, a Group of Picture (GOP) indicates a picture group, that is, a group of pictures.

In order to send video data, a transmission medium is necessary, and a transmission medium has different performance depending on various network environments. For applications to the various transmission media or network environments, a Scalable Video Coding (SVC) method can be employed.

The SVC method is a coding method of improving encoding/decoding performance by removing redundancy between layers using texture information, motion information, a residual signal, etc. between the layers. The SVC method can provide a variety of scalabilities from spatial, temporal, and Signal to Noise Ratio (SNR) viewpoints depending on surrounding conditions, such as a transmission bit rate, a transmission error rate, and system resources.

SVC can be performed using a multi-layer structure so that a bit stream applicable to various network conditions can be provided. For example, an SVC structure can include a base layer whose video data can be compressed and processed by utilizing a common video encoding method and can include an enhancement layer whose video data can be compressed and processed by using both encoding information of the base layer and a common video encoding method.

Here, a layer means a set of pictures and bit streams classified on the basis of a spatial resolution (e.g., an image size), a temporal resolution (e.g., encoding order, picture output order, and a frame rate), SNR, and complexity. Furthermore, the base layer may mean a reference layer, and the enhancement layer may mean an enhancement layer. Furthermore, multiple layers may have dependency between them.

Referring to FIG. 3, for example, a base layer can be defined by Standard Definition (SD), a frame rate of 15 Hz, and a bit rate of 1 Mbps. A first enhancement layer can be defined by High Definition (HD), a frame rate of 30 Hz, and a bit rate of 3.9 Mbps. A second enhancement layer can be defined by 4K-Ultra High Definition (UHD), a frame rate of 60 Hz, and a bit rate of 27.2 Mbps. A format, a frame rate, a bit rate, etc. are only exemplary embodiments and may be differently determined if necessary. Furthermore, the number of layers used is not limited to the present exemplary embodiment and may be differently determined according to circumstances.

For example, if a transmission bandwidth is 4 Mbps, the frame rate of the first enhancement layer HD can be reduced to less than 15 Hz. The SVC method can provide temporal, spatial, and SNR scalabilities according to the method described above in connection with the exemplary embodiment of FIG. 3.

SVC has the same meaning as scalable video encoding from an encoding viewpoint and has the same meaning as scalable video decoding from a decoding viewpoint.

As described above, scalability has now become an important function of a video format owing to heterogeneous communication networks and a variety of terminals. SVC, that is, an extension standard of Advanced Video Coding (AVC), was developed to generate a bit stream having a wide range of bit rates while maintaining compression efficiency to the highest degree. In order to satisfy the characteristics and changes of various devices and networks, an SVC bit stream can be easily extracted in various ways. That is, the SVC standard provides spatial, temporal, and SNR scalabilities.

Meanwhile, a bit stream including multiple layers consists of Network Abstraction Layer (NAL) units that enable the adaptive transport of video over a packet-switched network. Like in a multi-layer, a relationship between a plurality of views in multi-view video coding including a plurality of multi-view videos within a bit stream is similar to a relationship between spatial layers in video that support multiple layers.

In order to transform a bit stream effectively and efficiently in all nodes in a content delivery path, scalability information about the bit stream is very important. In a current standard for video coding for a single layer (i.e., high efficiency video coding), two fields related to layer information, that is, temporal_id and reserved_one_5bits are present in an NAL Unit (hereinafter referred as an 'NALU') header. The field 'temporal_id' having a length of 3 bits indicates the temporal layer of a video bit stream, and the field 'reserved_one_5bits' corresponds to an area for indicating another subsequent layer information.

The temporal layer means the layer of a temporally scalable bit stream which includes a Video Coding Layer (VCL) NALU, and the temporal layer has a specific temporal_id value.

The present invention relates to a method of effectively describing extraction information and scalability information about a picture within a bit stream that supports multiple layers and signaling the extraction information and scalability information and an apparatus for implementing the method.

In the present invention, a bit stream is divided into two types: a base type supporting only temporal scalability and an extended type capable of having scalability that supports spatial/SNR/multi-view.

The first type of the bit stream relates to a bit stream supporting a single layer video, and the second type thereof relates to an enhancement layer in HEVC-based layered video encoding. Hereinafter, there is proposed an improved method for representing scalability information about the two bit stream types. In accordance with the present invention, in the extended type, 'reserved_one_5bits' of 5 bits can be used as layer_id indicative of the identifier of a scalable layer.

Remove nal_ref_flag from NALU Header nal_ref_flag is used to indicate a non-reference picture. This information indicates approximate priority between a non-reference picture and a reference picture, but the use of nal_ref_flag is somewhat limited.

A reference picture means a picture including samples which may be used for inter-picture prediction when decoding subsequent pictures in decoding order.

A non-reference picture means a picture including samples not used for inter-picture prediction when decoding subsequent pictures in decoding order.

nal_ref_flag is a flag indicative of information indicating whether a corresponding NALU is a non-reference picture or a reference picture in the entire bit stream at the time of encoding.

When a value of nal_ref_flag is 1, an NALU means that it includes a Sequence Parameter Set (SPS), a Picture Parameter Set (PPS), an Adaptation Parameter Set (APS), or the slice of a reference picture. When a value of nal_ref_flag is 0, an NALU means that it includes a slice including some of or the entire non-reference picture.

Here, an NALU in which a value of nal_ref_flag is 1 can include the slice of a reference picture. nal_ref_flag has a value of 1 for the NALUs of a Video Parameter Set (VPS), a Sequence Parameter Set (SPS), or a Picture Parameter Set (PPS). If a value of nal_ref_flag is 0 in one of the VCL NALUs of a specific picture, nal_ref_flag has a value of 0 for all the VCL NALUs of the picture.

Meanwhile, if all non-reference pictures, particularly, non-reference pictures chiefly corresponding to the highest temporal layer are extracted, nal_ref_flag of all pictures remained after the extraction becomes 1.

However, some pictures of an adaptively transformed bit stream, that is, pictures corresponding to the highest temporal layer in the remaining bit streams, become non-reference pictures although a value of nal_ref_flag is 1.

In other words, another syntax element (e.g., temporal_id) of an NALU header can be more effective in supporting adaptive transform (or extraction). That is, a bit stream including a desired temporal layer can be extracted using the total number of temporal layers including a bit stream and a value of temporal_id of an NALU header.

Furthermore, nal_ref_flag may also be used to indicate whether or not a corresponding picture will be subsequently used as a reference picture when decoding (reconstructing) a picture formed of an NALU including nal_ref_flag and then storing the decoded picture in a memory, such as a Decoded Picture Buffer (DPB). If a value of nal_ref_flag is 1, it indicates that a corresponding picture is subsequently used as a reference picture. If a value of nal_ref_flag is 0, it indicates that a corresponding picture is not subsequently used as a reference picture.

A decoded picture can be indicated as a reference picture when storing the decoded picture in the DPB without determining whether or not a corresponding NALU is a non-reference picture or a reference picture based on nal_ref_flag. In this case, although the decoded picture is a non-reference picture, but is indicated as a reference picture, there is no problem because the corresponding picture will not be included in the reference picture list delivered in the slice header of a next picture when decoding the next picture of the corresponding picture in decoding order.

That is, whether or not a previously decoded picture is a reference picture or a non-reference picture is indicated based on the reference picture list included in the slice header of a next picture when decoding the next picture. Accordingly, there is no problem in determining whether or not a decoded picture is a reference picture or a non-reference picture even though the decoded picture is indicated as the reference picture without taking into account nal_ref_flag.

The present invention proposes that nal_ref_flag be deleted from an NALU header or the semantics of nal_ref_flag be changed. An embodiment related to the deletion of nal_ref_flag is as follows.

Embodiment 1

The flag 'nal_ref_flag' is changed into slice_ref_flag, and the position of the flag is moved from an NALU header to a slice header. The syntax of the slice header can be modified as in Table 1.

TABLE 1

| | Descriptor |
|---|---|
| slice_header( ) { | |
|   slice_ref_flag | u(1) |
|   first_slice_in_pic_flag | u(1) |
|   if (first_slice_in_pic_flag = = 0) | |
|     slice_address | u(v) |
|   ... | ue(v) |
| } | |

In Table 1, when a value of slice_ref_flag is 1, it indicates that a slice is part of a reference picture. When a value of slice_ref_flag is 0, it indicates that the slice is some of a non-reference picture.

Embodiment 2

The flag 'nal_ref_flag' is changed into au_ref_flag, and the position of the flag is moved from an NALU header to an access unit delimiter. The syntax of the access unit delimiter can be the same as Table 2.

TABLE 2

| | Descriptor |
|---|---|
| access_unit_delimiter_rbsp( ) { | |
|   pic_type | u(3) |
|   au_ref_flag | u(1) |
|   rbsp_trailing_bits( ) | |
| } | |

In Table 2, when a value of au_ref_flag is 1, it indicates that an access unit includes a reference picture. When a value of au_ref_flag is 0, it indicates that an access unit includes a non-reference picture.

Embodiment 3 nal_ref_flag is not moved to another syntax, but nal_ref_flag is deleted from an NALU header.

If nal_ref_flag, that is, flag information of 1 bit indicating whether a picture is a non-reference picture or a reference picture in the entire bit stream when decoding the picture, is deleted, a determination of whether or not a picture is a reference picture through nal_ref_flag can be performed through another process. After decoding a received picture, the decoded picture is unconditionally indicated as a reference picture in a Decoded Picture Buffer (DPB). That is, whether or not a decoded picture is a reference picture may not be determined, but the decoded picture can be indicated as a reference picture.

Thereafter, the slice header of a picture next to the decoded picture is parsed, and whether the decoded picture is a reference picture or a non-reference picture can be indicated based on reference picture information included in the slice header.

Embodiment 4 nal_ref_flag can be deleted from an NALU header, and temporal_id can be used to indicate the NALU is a non-reference picture. To indicate non-reference picture, temporal_id can be '7', a maximum number of temporal layers-1 (i.e., max_temporal_layers_minus1) included in a bit stream, or a preset value other than '0'.

Embodiment 5 nal_ref_flag can be deleted from an NALU header, and reserved_one_5bits can be used as a priority_id element in order to indicate the NALU is a non-reference picture. priority_id is an identifier indicating priority of the corresponding NALU and is used to provide a bit stream extraction function based on priority irrespective of a different spatial, temporal, and SNR.

That is, if temporal_id=Ta is the identifier of the highest temporal layer, temporal_id=Ta and the NALU, that is, priority_id=31 (or another specific value), is used to indicate that the NALU is the NALU of a non-reference picture.

1 bit used to signal nal_ref_flag can be used as one of the following things.

(1) The 1 bit can be used to indicate nal_unit_type. nal_unit_type can become a 7-bit signal, and the number of NALU types can be doubled.

(2) The 1 bit can be used to indicate temporal_id. temporal_id can become a 4-bit signal, and a maximum number of temporal layers can be doubled.

(3) The 1 bit can be used to indicate layer_id. layer_id means the identifier of the scalable layer of a layered bit stream and can be signaled by a reserved_one_5bits syntax element. 1 bit used to signal nal_ref_flag can be added to 5 bits of reserved_one_5bits used to identify a scalable layer, and thus layer_id can become a signal of 6 bits. If 6 bits are used, 64 scalable layers can be identified.

(4) The 1 bit can be used as a flag informing whether or not reserved_one_5bits indicates priority.

(5) The 1 bit can be used as reserved_bit.

If nal_ref_flag is not deleted from an NALU header, the semantics of nal_ref_flag can be modified as follows.

When a value of nal_ref_flag is 0, it indicates that an NALU includes only the slice of a non-reference picture. When a value of nal_ref_flag is 1, it indicates that an NALU can include the slice of a reference picture or a non-reference picture.

Activation Signaling of Video Parameter Set (VPS)

A VPS includes the most basic information for decoding video and can include contents present in the existing SPS.

The VPS can include information about a sub-layer that denotes a temporal layer supporting temporal scalability and information about multiple layers supporting spatial, quality, and view scalabilities. That is, the VPS may include multi-layer information, that is, syntaxes for an HEVC extension.

A. Video Parameter Set

Syntaxes for a VPS is the same as Table 3.

TABLE 3

| | Descriptor |
|---|---|
| video_parameter_set_rbsp( ) { | |
| video_parameter_set_id | ue(v) |
| max_temporal_layers_minus1 | u(3) |
| priority_id_flag | u(1) |
| extension_info_flag | u(1) |
| if(extension_info_flag = = 0) { | |
| pic_width_in_luma_samples | ue(v) |
| pic_height_in_luma_samples | ue(v) |
| pic_cropping_flag | u(1) |
| if(pic_cropping_flag) { | |
| pic_crop_left_offset | ue(v) |
| pic_crop_right_offsetv | ue(v) |
| pic_crop_top_offset | ue(v) |
| pic_crop_bottom_offset | ue(v) |
| } | |
| bit_depth_luma_minus8 | ue(v) |
| bit_depth_chroma_minus8 | ue(v) |
| chroma_format_idc | u(2) |
| temporal_id_nesting_flag | u(1) |
| for (i = 0; i <= num_temporal_layers_minus1; i++) { | |
| profile_idc[i] | u(8) |
| reserved_zero_8 bits[i] /* equal to 0 */ | u(8) |
| level_idc[i] | u(8) |
| } | |
| tiles_or_entropy_coding_sync_idc | u(2) |
| if(tiles_or_entropy_coding_sync_idc = = 1) { | |
| num_tile_columns_minus1 | ue(v) |
| num_tile_rows_minus1 | ue(v) |
| uniform_spacing_flag | u(1) |
| if(!uniform_spacing_flag) { | |
| for (i = 0; i < num_tile_columns_minus1; i++) | |
| column_width[i] | ue(v) |
| for(i = 0; i < num_tile_rows_minus1; i++) | |
| row_height[i] | ue(v) |
| } | |
| loop_filter_across_tiles_enabled_flag | u(1) |
| } | |
| } | |
| if(extension_info_flag = = 1) { | |
| extension_info( ) | |
| } | |
| rbsp_trailing_bits( ) | |
| } | |

In Table 3, most syntaxes have the same semantics as SPS syntaxes applied to a bit stream including a single layer, and additional parts are as follows.

video_parameter_set_id means the identifier of a VPS, and reference can be made to video_parameter_set_id in a Sequence Parameter Set (SPS), Supplementary Enhancement Information (SEI), or access unit delimiters.

When a value of priority_id_flag is 1, it indicates that reserved_one_5bits can be used identically with priority_id of an SVC standard. When a value of priority_id_flag is 0, it means that reserved_one_5bits can be used as layer_id.

When a value of extension_info_flag is 0, it indicates that a bit stream complies with a single layer standard of HEVC. When a value of extension_info_flag is 1, it indicates an enhancement layer for supporting scalability (i.e., when an HEVC extension is supported), and information related to a layer is provided.

B. Modification of Sequence Parameter Set (SPS)

As in Table 4, some of an existing syntax can be incorporated into a VPS and can be deleted from an SPS. Meanwhile, a vps_id syntax element can be added to the SPS. An SPS syntax to which vps_id has been added is the same as Table 4. In Table 4, a deleted syntax is indicated by a line that passes the middle of the syntax.

vps_id indicates an identifier for identifying a VPS to which reference can be made in the SPS and can have a range of 0 to X.

TABLE 4

| | Descriptor |
|---|---|
| seq_parameter_set_rbsp( ) { | |
| seq_parameter_set_id | ue(v) |
| vps_id | ue(v) |
| sps_extension_flag | u(1) |
| if(sps_extension_flag) | |
| while(more_rbsp_data( )) | |
| sps_extension_data_flag | u(1) |
| rbsp_trailing_bits( ) | |
| } | |

C. Activation Signaling for VPS

A slice header includes index information about a Picture Parameter Set (PPS) to which a corresponding slice refers, and a PPS includes index information about a Sequence Parameter Set (SPS) to which a corresponding picture refers. The SPS includes information about a Video Parameter Set (VPS) to which a corresponding sequence refers. As described above, when information about a parameter set is parsed, and, then, reference to information about the parsed parameter set, it is called activation.

In order to use information about a specific parameter set, that is, in order to activate the parameter set, the parameter set needs to be gradually parsed from a slice header. It means that all slice headers and a related PPS needs to be analyzed in order to know what SPS is activated.

When extracting some of a sub-layer (i.e., temporal layer) from a bit stream including a single layer, an extractor needs to analyze (or parse) an NALU header and a plurality of parameter sets.

If information for the extraction of an NALU is included in a VPS or an SPS, the extractor needs to sequentially parse a higher parameter set from a slice header. This means that the extractor needs to understand all the syntax elements of parameter sets and the slice header.

On the other hand, without a complicated parsing process even in a video decoding process, vps_id or sps_id can be searched for and only necessary parameter sets can be activated. In this case, if a VPS or an SPS includes parameter index information to be activated, a parsing procedure for a complicated slice header and a related PPS can be reduced.

Meanwhile, only some of the elements of the syntaxes can include pieces of information necessary to extract a bit stream. Nevertheless, to analyze all syntax elements can become a big burden on an extractor. In order to solve this problem, the following method is proposed.

In the present invention, the activation of a parameter set means that signaling is performed so that an extractor can be aware that what parameter set is activated without analyzing a slice header and a related Picture Parameter Set (PPS).

In accordance with the present invention, which VPS, SPS, or PPS is active can be additionally signaled so that a burden on an extractor which needs to analyze all slice headers and a related PPS is reduced.

A VPS may be updated. One of the following three methods can be used so that an extractor can be aware of an active VPS and a related SPS or PPS without analyzing a slice header.

(1) vps_id, sps_id, and pps_id can be included in an access unit delimiter. vps_id, sps_id, and pps_id indicate the identifiers of respective VPS, SPS, and PPS used for NALUs of a related AU.

In order to indicate whether or not the identifiers are present in the access unit delimiter, vps_id_present_flag, sps_id_present_flag, and pps_id_present_flag are used. The syntax of a proposed access unit delimiter is the same as Table 5.

TABLE 5

| | Descriptor |
|---|---|
| access_unit_delimiter_rbsp( ) { | |
|   pic_type | u(3) |
|   vps_id_present_flag | u(1) |
|   sps_id_present_flag | u(1) |
|   pps_id_present_flag | u(1) |
|   if (vps_id_present_flag) | |
|     vps_id | ue(v) |
|   if (sps_id_present_flag) | |
|     sps_id | ue(v) |
|   if (pps_id_present_flag) | |
|     pps_id | ue(v) |
|   rbsp_trailing_bits( ) | |
| } | |

(1-1) In another method, sps_id and pps_id are excluded and only vps_id can be included in an access unit delimiter as in Table 6.

TABLE 6

| | Descriptor |
|---|---|
| access_unit_delimiter_rbsp( ) { | |
|   pic_type | u(3) |
|   vps_id | ue(v) |
|   rbsp_trailing_bits( ) | |
| } | |

(2) Another method for the activation signaling of a VPS is to use a new SEO message 'parameter_set_reference'. The SEI message includes a syntax for informing whether or not vps_id, sps_id, and pps_id indicative of the identifiers of a VPS, an SPS, and an PPS used for NALUs within a related AU are present.

In order to indicate whether or not the identifiers are present, vps_id_present_flag, sps_id_present_flag, and pps_id_present_flagsyntax can be used, and an SEI syntax is the same as Table 7.

TABLE 7

| | Descriptor |
|---|---|
| parameter_set_reference(payloadSize) { | |
|   vps_id_present_flag | u(1) |
|   sps_id_present_flag | u(1) |
|   pps_id_present_flag | u(1) |
|   if(vps_id_present_flag) | |
|     vps_id | ue(v) |
|   if(sps_id_present_flag) | |
|     sps_id | ue(v) |
|   if(pps_id_present_flag) | |
|     pps_id | ue(v) |
| } | |

(2-1) Furthermore, the activation of a VPS and an SPS can be informed by excluding pps_id and including sps_id and vps_id in an SEI message as in <Table 8>. sps_id and vps_id in an SEI message can include sps_id and vps_id to which the video coding layer NALU of an access unit associated with the SEI message refer. Accordingly, sps_id and vps_id can indicate information about a parameter set having a possibility of activation.

TABLE 8

| | Descriptor |
|---|---|
| parameter_set_reference(payloadSize) { | |
|   vps_id | u(4) |
|   sps_id_present_flag | u(1) |
|   if(sps_id_present_flag) | |
|     sps_id | ue(v) |
|   psr_extension_flag | u(1) |
|   if(psr_extension_flag){ | |
|     psr_extension_length | ue(v) |
|     for(i=0; i<psr_extension_length; i++) | |
|       psr_extension_data_byte | u(8) |
|   } | |
| } | |

In Table 8, vps_id indicates video_parameter_set_id of a VPS now activated. A value of vps_id can have a value of 0-15.

If sps_id_present_flag has a value of 1, it indicates that sequence_parameter_set_id of an SPS now activated is included in a corresponding SEI message. If sps_id_present_flag has a value of 0, it indicates sequence_parameter_set_id of an SPS now activated is not included in a corresponding SEI message.

sps_id indicates sequence_parameter_set_id of an SPS now activated. sps_id can have a value of 0~31, more limitedly, a value of 0~15.

When a value of psr_extension_flag is 0, it indicates that a SEI message extension syntax element is not included in a SEI message. When a value of psr_extension_flag is 1, it indicates that a SEI message extension syntax element including a SEI message is extended and used.

psr_extension_length indicates the length of psr_extension_data. psr_extension_length can have a value ranging from 0 to 256, and psr_extension_data_byte can have any value.

(2-2) Furthermore, one or more sps_id and vps_id other than pps_id may be included in an SEI message and then signaled as in Table 9.

TABLE 9

| | Descriptor |
|---|---|
| parameter_set_reference(payloadSize) { | |
|   vps_id | u(4) |

TABLE 9-continued

| | Descriptor |
|---|---|
| num_referenced_sps | u(5) |
| for (i=0; i< num_referenced_sps; i++) | |
| sps_id(i) | ue(v) |
| } | |

In Table 9, vps_id indicates video_parameter_set_id of an active VPS. vps_id can have a value of 0~15.

num_reference_sps indicates the number of SPSs that refer to active vps_id.

sps_id(i) indicates sequence_parameter_set_id of an active SPS, and sps_id can have a value of 0~31, more limitedly, a value of 0~15.

(2-3) Furthermore, only vps_id other than sps_id and pps_id may be included in an SEI message and then signaled as in Table 10.

TABLE 10

| | Descriptor |
|---|---|
| parameter_set_reference(payloadSize) { | |
| vps_id | ue(v) |
| } | |

(3) Another method for the activation signaling of a VPS is to include information, informing vps_id, sps_id, and pps_id, in a buffering period SEI message. Table 11 shows a syntax including vps_id_present_flag, sps_id_present_flag, and pps_id_present_flag indicating whether or not vps_id, sps_id, and pps_id are present.

TABLE 11

| | Descriptor |
|---|---|
| buffering_period(payloadSize) { | |
| vps_id_present_flag | u(1) |
| sps_id_present_flag | u(1) |
| pps_id_present_flag | u(1) |
| if(vps_id_present_flag) | |
| vps_id | ue(v) |
| if(sps_id_present_flag) | |
| sps_id | ue(v) |
| if(pps_id_present_flag) | |
| pps_id | ue(v) |
| ..... | |
| } | |

(3-1) Furthermore, as in Table 12, the activation of a VPS may be signaled by including only vps_id other than sps_id and pps_id in the buffering period SEI message.

TABLE 12

| | Descriptor |
|---|---|
| buffering_period(payloadSize) { | |
| vps_id_present_flag | u(1) |
| if(vps_id_present_flag) | |
| vps_id | ue(v) |
| ..... | |
| } | |

(4) Another method for the activation signaling of a parameter set is to include information, informing vps_id, sps_id, and pps_id, in a recovery point SEI message. Table 13 shows a syntax including vps_id_present_flag, sps_id_present_flag, and pps_id_present_flag indicating whether or not vps_id, sps_id, and pps_id are present.

TABLE 13

| | Descriptor |
|---|---|
| recovery_point( payloadSize ) { | |
| vps_id_present_flag | u(1) |
| sps_id_present_flag | u(1) |
| pps_id_present_flag | u(1) |
| if( vps_id_present_flag ) | |
| vps_id | ue(v) |
| if( sps_id_present_flag ) | |
| sps_id | ue(v) |
| if( pps_id_present_flag ) | |
| pps_id | ue(v) |
| recovery_poc_cnt | ue(v) |
| exact_match_flag | u(1) |
| broken_link_flag | u(1) |
| } | |

(4-1) Furthermore, as Table 14, there may be a method of informing vps_id, sps_id, and pps_id by including only vps_id other than sps_id and pps_id in the recovery point SEI message.

TABLE 14

| | Descriptor |
|---|---|
| recovery_point (payloadSize ) { | |
| vps_id_present_flag | u(1) |
| if (vps_id_present_flag ) | |
| vps_id | ue(v) |
| recovery_poc_cnt | ue(v) |
| exact_match_flag | u(1) |
| broken_link_flag | u(1) |
| } | |

Messages for delivering the vps_id or sps_id can be included in an Intra Random Access Point (IRAP) access unit.

If any one of the above-described information signaling methods is included in an access unit and utilized, an extractor can identify vps_id, sps_id, and pps_id values through the above-described signaling method in order to extract a bit stream and can manage one or more vps/sps/pps.

Furthermore, a decoding apparatus or a decoding module for performing decoding can identify vps_id, sps_id, and pps_id values through the above-described signaling method and can decode the associated AUs with the signaling method by activating the parameter sets.

Representation of a Bit Stream in an Extended Type

Hereinafter, there are proposed extension_info( ) of VPS and a new SEI message to describe and signal information about a scalable layer if a bit stream supporting a layer extension is included. In order to represent a bit stream in the extended type, the following information can be signaled.

layer_id signals whether or not it deliver a priority value of a layer.

Here, a spatial layer (identified by a dependency_id value), an SNR layer (identified by a quality_id value), views (identified by a view_id value), etc. can be signaled in response to each layer_id value, and a temporal layer can be identified by temporal_id of an NALU header.

Furthermore, the region of video related to layer_id can be signaled by region_id.

Furthermore, dependency information, bit rate information for each scalable layer, and quality information for each scalable layer can be signaled.

extension_info( ) syntax is the same as Table 15.

TABLE 15

```
extension_info( ){
    num_frame_sizes_minus1                                      ue(v)
    num_rep_formats_minus1                                      ue(v)
    for(i = 0; i <= num_frame_sizes_minus1; i++) {
        pic_width_in_luma_samples[i]                            ue(v)
        pic_height_in_luma_samples[i]                           ue(v)
        pic_cropping_flag[i]                                    u(1)
        if(pic_cropping_flag[i]) {
            pic_crop_left_offset[i]                             ue(v)
            pic_crop_right_offsetv[i]                           ue(v)
            pic_crop_top_offset[i]                              ue(v)
            pic_crop_bottom_offset[i]                           ue(v)
        }
    }
    for(i = 0; i <= num_rep_formats_minus1; i++) {
        bit_depth_luma_minus8[i]                                ue(v)
        bit_depth_chroma_minus8[i]                              ue(v)
        chroma_format_idc[i]                                    u(2)
    }
    num_layers_minus1                                           ue(v)
    dependency_id_flag                                          u(1)
    quality_id_flag                                             u(1)
    view_id_flag                                                u(1)
    region_id_flag                                              u(1)
    layer_dependency_info_flag                                  u(1)
    for(i = 1; i <= num_layers_minus1; i++) {
        frame_size_idx[i]                                       ue(v)
        rep_format_idx[i]                                       ue(v)
        if(dependency_id_flag) {
            one_dependency_id_flag[i]                           u(1)
            if(one_dependency_id_flag[i] == 1)
                dependency_id[i]                                ue(v)
            else if(one_dependency_id_flag[i] == 0) {
                dependency_id_min[i]                            ue(v)
                dependency_id_max[i]                            ue(v)
            }
        }
        if(quality_id_flag) {
            one_quality_id_flag[i]                              u(1)
            if(one_quality_id_flag[i] == 1)
                quality_id[i]                                   ue(v)
            else if(one_quality_id_flag[i] == 0) {
                quality_id_min[i]                               ue(v)
                quality_id_max[i]                               ue(v)
            }
        }
        if (view_id_flag) {
            one_view_id_flag[i]                                 u(1)
            depth_flag[i]                                       u(1)
            if (one_view_id_flag[i] == 1)
                view_id[i]                                      ue(v)
            else if (one_view_id_flag[i] == 0) {
                view_id_min[i]                                  ue(v)
                view_id_max[i]                                  ue(v)
            }
        }
        if (region_id_flag) {
            num_regions_minus1[i]                               u(8)
            for (j = 1; j <= num_regions_minus1[i]; j++ )
                region_id[i][j]                                 u(8)
        }
        if (layer_dependency_info_flag ) {
            num_directly_dependent_layers[i]                    u(8)
            for (j = 0; j < num_directly_dependent_layers[i]; j++ )
                directly_dependent_layer_id_delta_minus1[i][j]  u(8)
        }
    }
}
```

The semantics of the syntax of Table 15 is as follows.

num_frame_sizes_minus1 plus 1 indicates a maximum number of size information (e.g., pic_width_in_luma_samples[i], pic_height_in_luma_samples[i], pic_cropping_flag[i], pic_cropping_flag[i], pic_crop_left_offset[i], pic_crop_right_offsetv[i], pic_crop_top_offset[i], and pic_crop_bottom_offset[i]) of other types of pictures included in an encoded video sequence. A value of num_frame_sizes_minus1 can be 0~X. Other types of pictures can include pictures having different resolutions.

num_rep_formats_minus1 plus 1 indicates a maximum number of different types of bit depths and chroma formats (e.g., bit_depth_luma_minus8[i], bit_depth_chroma_minus8[i], and chroma_format_idc values[i]) included in an encoded video sequence. A value of num_rep_formats_minus1 can be a range of 0~X.

pic_width_in_luma_samples[i], pic_height_in_luma_samples[i], pic_cropping_flag[i], pic_cropping_flag[i], pic_crop_left_offset[i], pic_crop_right_offsetv[i], pic_crop_top_offset[i], and pic_crop_bottom_offset[i] indicate $i^{th}$ pic_width_in_luma_samples, pic_height_in_luma_samples, pic_cropping_flag, pic_cropping_flag, pic_crop_left_offset, pic_crop_right_offsetv, pic_crop_top_offset, pic_crop_bottom_offset values of an encoded video sequence.

bit_depth_luma_minus8[i], bit_depth_chroma_minus8[i], and chroma_format_idc[i] indicate $i^{th}$ bit_depth_luma_minus8, bit_depth_chroma_minus8, and chroma_format_idc values of an encoded video sequence.

num_layers_minus1 indicates the number of scalable layers that are available in a bit stream.

When a value of dependency_id_flag is 1, it indicates that one or more dependency_id values related to a layer_id value are present.

When a value of quality_id_flag is 1, it indicates that one or more quality_id values related to a layer_id value are present.

When a value of view_id_flag is 1, it indicates that one or more view_id values related to a layer_id value are present.

When a value of region_id_flag is 1, it indicates that and one or more related region_id values related to a layer_id value are present.

When a value of layer_dependency_info_flag is 1, it indicates that dependency information of a scalable layer is provided.

frame_size_idx[i] indicates an index for a set of frame sizes applied to a layer having a layer_id value of i. frame_size_idx[i] has a value ranging from 0 to X.

rep_format_idx[i] indicates an index for a set of a bit depth and a chroma format applied to a layer having a layer_id value of i. rep_format_idx[i] has a value ranging from 0 to X.

When a value of one_dependency_id_flag[i] is 1, it indicates that there is only one dependency_id associated with layer whose layer_id is i. When a value of one_dependency_id_flag[i] is 0, it indicates that there are two or more dependency_id associated with layer whose layer_id is i.

dependency_id[i] indicates value of dependency_id associated with a layer whose layer_id is i.

dependency_id_min[i] and dependency_id_max[i] indicate a minimum dependency_id value and a maximum dependency_id value associated with a layer whose layer_id is i1, respectively.

When a value of one_quality_id_flag[i] is 1, it indicates that there is only one quality_id associated with a layer whose layer_id is i. When a value of one_quality_id_flag[i] is 0, it indicates that there are two or more quality_id values associated with layer whose layer_id is i.

quality_id[i] indicates a value of quality id associated with layer whose layer_id is i.

quality_id_min[i] and quality_id_max[i] indicate a minimum qualtiy_id value and a maximum quality_id value associated with layer whose layer_id is l, respectively When a value of one_view_id_flag[i] is 1, it indicates that there is one view_id associated with layer whose layer_id is i. When a value of one_view_id_flag[i] is 0, it indicates that there are two or more view_id values associated with layer whose layer_id is i.

view_id[i] indicates a value of view_id associated with layer whose layer_id is i.

When a value of depth_flag[i] is 1, it indicates that a scalable layer whose layer_id is i includes depth information of a 3-D video bit stream.

view_id_min[i] and view_id_max[i] indicate a minimum view_id value and a maximum view_id value associated with layer whose layer_id is i.

num_regions_minus1 plus1 indicates the number of regions associated with layer whose layer_id is i.

region_id[j] indicates the identifier of a region j associated with layer whose layer_id is i.

num_directly_dependent_layers[i] indicates the number of scalable layers (i.e., the number of layers necessary to generate a predicted signal when decoding is performed) with which a current scalable layer i is directly associated.

directly_dependent_layer_id_delta_minus1[i][j] plus 1 indicates a difference between layer_id[i], that is, a current scalable layer, and the layer identifier of a $j^{th}$ scalable layer with which the current scalable layer is directly associated. The layer identifier of the $j^{th}$ scalable layer with which the current scalable layer is directly associated is the same as (layer_id[i]—directly_dependent_layer_id_delta_minus1[i][j]−1).

An extension_info( ) syntax according to another embodiment is the same as Table 16.

TABLE 16

| extension_info( ){ | |
|---|---|
| num_frame_sizes_minus1 | ue(v) |
| num_rep_formats_minus1 | ue(v) |
| for (i = 0; i <= num_rep_formats_minus1; i++) { | |
| pic_width_in_luma_samples[i] | ue(v) |
| pic_height_in_luma_samples[i] | ue(v) |
| bit_depth_luma_minus8[i] | ue(v) |
| bit_depth_chroma_minus8[i] | ue(v) |
| chroma_format_idc[i] | u(2) |
| pic_cropping_flag[i] | u(1) |
| if(pic_cropping_flag[i]) { | |
| pic_crop_left_offset[i] | ue(v) |
| pic_crop_right_offsetv[i] | ue(v) |
| pic_crop_top_offset[i] | ue(v) |
| pic_crop_bottom_offset[i] | ue(v) |
| } | |
| } | |
| num_layers_minus1 | ue(v) |
| dependency_id_flag | u(1) |
| quality_id_flag | u(1) |
| view_id _flag | u(1) |
| region_id_flag | u(1) |
| layer_dependency_info_flag | u(1) |
| for (i = 1; i <= num_layers_minus1; i++) { | |
| frame_size_idx[i] | ue(v) |
| rep_format_idx[i] | ue(v) |
| if(dependency_id_flag) { | |
| one_dependency_id_flag[i] | u(1) |
| if (one_dependency_id_flag[i] = = 1) | |
| dependency_id[i] | ue(v) |
| else if(one_dependency_id_flag[i] = = 0) { | |
| dependency_id_min[i] | ue(v) |
| dependency_id_max[i] | ue(v) |
| } | |

As shown in Table 16, pic_width_in_luma_samples[i] and pic_height_in_luma_samples[i], bit_depth_luma_minus8[i], bit_depth_chroma_minus8[i], and chroma_format_idc[i] can be signaled through information about different representation formats.

In accordance with another embodiment, pic_width_in_luma_samples[i], pic_height_in_luma_samples[i], bit_depth_luma_minus8[i], bit_depth_chroma_minus8[i], and chroma_format_idc[i] can be signaled through information about different pictures, that is, pictures having different resolutions.

An syntax for an activation SEI message for the signaling of a bit rate and quality information is the same as Table 17.

TABLE 17

| | Descriptor |
|---|---|
| bit rate_quality_info(payloadSize) { | |
| num_layers_minus1 | ue(v) |
| bit rate_info_flag | u(1) |
| quality_info_flag | u(1) |
| quality_type_flag | u(1) |
| for(i = 1; i <= num_layers_minus1; i++) { | |
| if(bit rate_info_flag) { | |
| max_ bit rate[i] | u(8) |
| average_ bit rate[i] | u(8) |
| } | |
| if(quality_info_flag) { | |
| quality_value[i] | u(8) |
| } | |
| } | |
| if(quality_type_flag) { | |
| QualityTypeUriIdx = 0 | |
| do | |
| quality_type_uri[QualityTypeUriIdx] | b(8) |
| while(quality_type_uri[QualityTypeUriIdx++] != 0) | |
| } | |
| } | |

The semantics of the syntax of Table 17 are as follows.

num_layers_minus1 indicates the number of scalable layers that can be provided in a bit stream.

When a value of bit rate_info_flag is 1, it indicates that bit rate information for each scalable layer is provided.

When a value of quality_info_flag is 1, it indicates that information for a quality value of each scalable layer is provided.

When a value of quality_type_flag is 1, it indicates that information for a quality type for each scalable layer is provided.

max_bit rate[i] indicates a maximum bit rate of a scalable layer whose layer_id value is i, and average_bit rate[i] indicates an average bit rate of a scalable layer whose layer_id value is i.

quality_value[i] indicates a quality value of a scalable layer i.

quality_type_uri[QualityTypeUriIdx] indicates a Universal Resource Identifier (URI) having QualityTypeUriIdx-th bytes of a null0terminated string encoded in UTF-8 characters and indicating including an expression for the type of quality values.

Hereinafter, a scheme to improve a Video Parameter Set(VPS) is proposed in order to efficiently extract a bitstream.

Layer Referencing

A method indicating a relationship between layer_id and a scalability dimension ID in a bit stream supporting multiple layers can include the first method and the second method. The first method informs a mapping method between layer_id and the scalability dimension ID. The second method partitions or splices the bits of layer_id, and then, informs which dimension type is present in the partitioned or spliced bit.

In a bit stream supporting multiple layers, a dimension type can mean the type of scalability, such as spatial scalability and quality scalability, and a dimension ID can mean an index of a layer for a specific dimension type.

In a bit stream supporting multiple layers, in general, a specific layer (in order to help understanding, for example, in the case where temporal scalability is supported in a bit stream of a single layer, a temporal layer (sub-layer) 3) can directly refer to a next lower layer (e.g., a temporal layer (sub-layer) 2) in a specific dimension.

For example, in the case where spatial scalability is supported, it means that a spatial layer 2 directly refers to a next lower space layer 1.

Accordingly, in order to indicate the above case, it is proposed that a dimension having default direct dependency be first described.

Thereafter, specific dependency is described in detail in a description loop for a scalable layer.

A scheme for signaling layer referencing using the two methods is proposed below. An improved syntax for vps_extension is the same as Table 18 to Table 21.

TABLE 18

|  | Descriptor |
| --- | --- |
| vps_extension( ) { | |
|   while(!byte_aligned( )) | |
|     vps_extension_byte_alignment_reserved_one_ bits | u(1) |
|   all_default_dependency_flag | u(1) |
|   if(all_default_dependency_flag = = 0) { | |
|     num_default_dim_minus1 | u(4) |
|     for(j = 0; j <= num_default_dim_minus1; j++) { | |
|       dimension[j] | u(4) |
|     } | |
|   } | |
|   for(i = 1; i <= vps_max_layers_minus1; i++) { | |
|     // mapping of layer ID to scalability dimension IDs | |
|     num_dimensions_minus1[i] | u(4) |
|     for (j = 0; j <= num_dimensions_minus1; j++) { | |
|       dimension_type[i][j] | u(4) |
|       dimension_id[i][j] | u(8) |
|     } | |
|     // layer dependency | |
|     specific_dependency_flag[i] | u(1) |
|     if(specific_dependency_flag[i] = =1) { | |
|       num_direct_ref_layers[i] | u(6) |
|       for (j = 0; j < num_direct_ref_layers[i]; j++) | |
|         ref_layer_id[i][j] | u(6) |
|     } | |
|   } | |
| } | |

Table 18 shows a syntax that maps layer_id to a scalability dimension ID using the first method. The semantics of the syntax of Table 18 is as follows.

When a value of all_default_dependency_flag is 1, it indicates that all layer dimensions have default dependency. That is, it means that in a specific dimension i, a layer having 'dimension_id[i]=n' directly refers to another layer having dimension_id[i]=n−1 by default.

When a value of all_default_dependency_flag is 0, it indicates that all layer dimensions may not have default dependency. When a value of all_default_dependency_flag is 0, the following 'num_default_dim_minus1' is signaled. num_default_dim_minus1 indicates the number of dimensions having default dependency.

dimension[j] specifies the type of a layer dimension having default dependency. That is, information about the type of a layer dimension having default dependency is signaled while increasing the number of dimensions having default dependency one by one. In a corresponding dimension, a higher layer (e.g., dimension_id=n) will directly refer to a next lower layer (e.g., dimension_id=n−1).

When a value of specific_dependency_flag[i] is 1, it means that there are direct dependences/references described in detail for a corresponding layer. Accordingly, when a value of specific_dependency_flag[i] is 1, the number of layers and the ID of the layers to which a corresponding layer directly refers are signaled.

What a layer C directly refers to a layer B means that a decoder needs to use information (decoded or not decoded) of the layer B in order to decode the layer C. If the layer B directly uses information of a layer A, it is not considered that the layer C directly refers to the layer A.

TABLE 19

|  | Descriptor |
| --- | --- |
| vps_extension( ) { | |
|   while(!byte_aligned( )) | |
|     vps_extension_byte_alignment_reserved_one_ bits | u(1) |
|   all_default_dependency_flag | u(1) |
|   if(all_default_dependency_flag = = 0) { | |
|     num_default_dim_minus1 | u(4) |
|     for (j = 0; j <= num_default_dim_minus1; j++) { | |
|       dimension[j] | u(4) |
|     } | |
|   } | |
|   // scalability type and layer_id partitioning method | |
|   num_dimensions_minus1 | |
|   for (i = 0; i <= num_dimensions_minus1; i++) { | |
|     dimension_type[i] | u(4) |
|     layer_id_dim_len[i] | u(3) |
|   } | |
|   for (i = 0; i <= max_num_layers_minus1; i++) { | |
|     vps_layer_id[i] | u(6) |
|     // layer dependency | |
|     specific_dependency_flag[i] | u(1) |
|     if(specific_dependency_flag[i] = =1) { | |
|       num_direct_ref_layers[i] | u(6) |
|       for (j = 0; j < num_direct_ref_layers[i]; j++) | |
|         ref_layer_id[i][j] | u(6) |
|     } | |
|   } | |
| } | |

Table 19 shows a syntax in which the bits of layer_id is allocated to a scalability dimension type and the length of an allocated dimension type is signaled using the second method.

num_dimensions_minus1 described in Table 19 indicates the number of layer dimensions that are present in an NALU header. That is, the number of layer dimensions present in the NALU header is checked, and a layer type present in each corresponding layer dimension and the number of bits allocated to the dimension type are checked.

The syntax 'all_default_dependency_flag, num_default_dim_minus1, dimension[j], and specific_dependency_flag[i]' for layer referencing described in Table 19 has the same semantics as the syntax described in Table 18.

Tables 20 and 21 describe alternative syntaxes to Tables 18 and 19. Table 20 shows alternative syntax indicating default dependency when the first method is used, and Table 21 shows alternative syntax indicating default dependency when the second method is used.

TABLE 20

| | Descriptor |
|---|---|
| vps_extension( ) { | |
|   while(!byte_aligned( )) | |
|     vps_extension_byte_alignment_reserved_one_ bits | u(1) |
|   num_dimensions_minus1] | u(4) |
|   for (i = 0; i <= num_dimensions_minus1; i++) { | |
|     dimension_type[i] | u(4) |
|     default_dependency_flag[i] | u(1) |
|   } | |
|   for (i = 1; i <= vps_max_layers_minus1; i++) { | |
|     // mapping of layer ID to scalability dimension IDs | |
|     for (j = 0; j <= num_dimensions_minus1; j++) { | |
|       dimension_id[i][j] | u(8) |
|     } | |
|     // layer dependency | |
|     specific_dependency_flag[i] | u(1) |
|     if(specific_dependency_flag[i] = =1) { | |
|       num_direct_ref_layers[i] | u(6) |
|       for (j = 0; j < num_direct_ref_layers[i]; j++) | |
|         ref_layer_id[i][j] | u(6) |
|     } | |
|   } | |
| } | |

TABLE 21

| | Descriptor |
|---|---|
| vps_extension( ) { | |
|   while(!byte_aligned( )) | |
|     vps_extension_byte_alignment_reserved_one_ bits | u(1) |
|   // scalability type and layer_id partitioning method | |
|   num_dimensions_minus1 | |
|   for (i = 0; i <= num_dimensions_minus1; i++) { | |
|     dimension_type[i] | u(4) |
|     layer_id_dim_len[i] | u(3) |
|     default_dependency_flag[i] | u(1) |
|   } | |
|   for (i = 0; i <= max_num_layers_minus1; i++) { | |
|     vps_layer_id[i] | u(6) |
|     // layer dependency | |
|     specific_dependency_flag[i] | u(1) |
|     if(specific_dependency_flag[i] = =1) { | |
|       num_direct_ref_layers[i] | u(6) |
|       for (j = 0; j < num_direct_ref_layers[i]; j++) | |
|         ref_layer_id[i][j] | u(6) |
|     } | |
|   } | |
| } | |

Among the syntaxes in Tables 20 and 21, description of the syntaxes that is described in Table 18 and 19 is omitted.

A new syntax 'default_dependency_flag[i]' in Tables 20 and 21 indicates whether or not a dimension type i uses default dependency. In a corresponding dimension, a high layer (e.g., dimension_id[i]=n) directly refers to a right-under layer (e.g., dimension_id[i]=n−1).

That is, after a specific dimension type is designated by num_dimensions_minus1 and dimension_type[i], whether or not the specific dimension type uses default dependency is signaled. If it is not signaled, it indicates that information for a layer to which the corresponding layer directly refers is signaled.

Dimension types according to the present invention are listed in Table 22.

TABLE 22

| dimension_type[i][j] | dimension_id[i][j] |
|---|---|
| 0 | view order idx |
| 1 | depth flag |

TABLE 22-continued

| dimension_type[i][j] | dimension_id[i][j] |
|---|---|
| 2 | dependency ID |
| 3 | quality ID |
| 4 | priority ID |
| 5 | region ID |
| 6..15 | reserved |

In accordance with the present invention, dimension types 4 and 5, that is, types indicative of a priority ID and a region ID, have been added in an existing dimension type.

dimension_type[i][j] can have a value between 0 and 5. Other values can be subsequently defined, and a decoder can neglect a value of dimension_type[i][j] if dimension_type[i][j] does not have the value between 0 and 5.

If dimension_type has a value of 4, corresponding dimension_id indicates the ID of a priority layer of a bit stream in the SVC standard.

If dimension_type has a value of 5, corresponding dimension_id indicates the ID of a specific region of a bit stream. The specific region can be one or more spatial-temporal segments in the bit stream.

Figure 4:
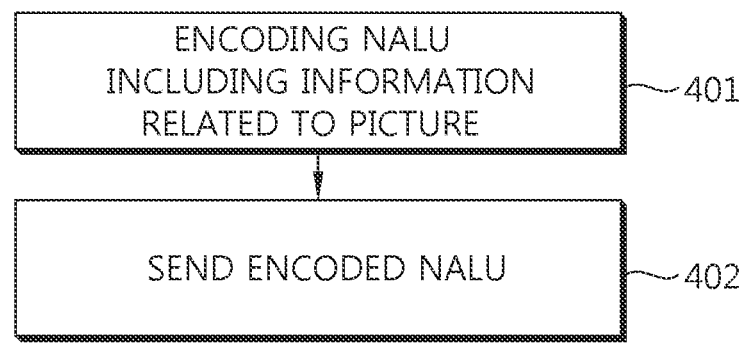
FIG. 4 is a control flowchart illustrating a method of encoding video information in accordance with the present invention.

FIG. 4 is a control flowchart illustrating a method of encoding video information in accordance with the present invention.

Referring to FIG. 4, the encoding apparatus encodes a Network Abstraction Layer (NAL) unit including information related to video at step 401.

The NALU header of the NALU does not include information indicating whether or not the NALU includes a slice including at least some of or the entire non-reference picture.

Meanwhile, the NALU header includes layer ID information to identify a scalable layer in a bit stream supporting a scalable layer.

Here, a bit used to signal information, indicating whether or not an NALU except the NALU header includes a slice including at least some of or the entire non-reference picture, can be used to signal the layer ID information.

Furthermore, the NALU can include information about a variety of parameter sets necessary to decode video.

The encoding apparatus can encode a Supplementary Enhancement Information (SEI) message, including information about an active parameter sets, as an independent NALU.

The information about the active parameter sets can include at least one of information on which an active VPS is indexed and information on which an active SPS is indexed.

Furthermore, information about an active parameter sets can include information on which an active VPS is indexed, information about the number of SPSs that refer to the active VPS, and information on which the SPSs are indexed.

The decoding apparatus can use the information about the parameter sets to extract a sub-layer that provides temporal scalability.

Furthermore, the decoding apparatus or a decoding module for performing decoding can use the information about the parameter sets when activating parameter sets necessary to decode a video coding layer NALU.

The encoding apparatus sends the NALU, including the information related to the encoded video, in the form of a bit stream at step 402.

Figure 5:
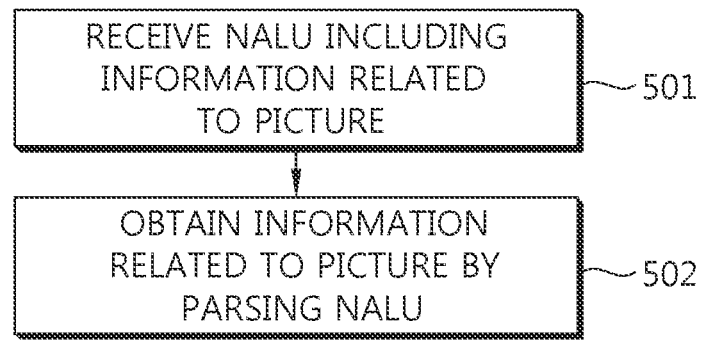
FIG. 5 is a control flowchart illustrating a method of decoding video information in accordance with the present invention.

FIG. 5 is a control flowchart illustrating a method of decoding video information in accordance with the present invention.

Referring to FIG. 5, the decoding apparatus receives an NALU, including information related to encoded video, through a bit stream at step 501.

The decoding apparatus parses the header and NAL payload of the NALU at step 502. The parsing of the video information can be performed by an entropy decoding module or an additional parsing module.

The decoding apparatus can obtain various pieces of information including in the header and NAL payload of the NALU through the parsing.

The NALU header can include layer ID information for identifying a scalable layer in the bit stream supporting the scalable layer and may not include flag information of 1 bit indicating whether the NALU is a non-reference picture or a reference picture in the entire bit stream when encoding the video data.

Here, a bit used to signal information indicating whether or not an NALU except for the NALU header includes a slice including at least some of or the entire non-reference picture can be used to signal layer ID information.

Furthermore, the decoding apparatus can obtain information about parameter sets, that is included in a SEI message, through the parsing. The obtained information for the parameter sets is necessary to decode an NALU associated with a SEI message.

Information about active parameter sets can include at least one of information on which an active VPS is indexed and information on which an active SPS is indexed.

Furthermore, the information about the active parameter sets can include information on which the active VPS is indexed, information indicative of the number of SPSs that refer to the active VPS, and information on which the SPSs are indexed.

The decoding apparatus can use these pieces of information about parameter sets to extract a sub-layer providing temporal scalability.

In addition, the pieces of information about parameter sets can be used when decoding a bit stream or in a session negotiation (e.g., a session negotiation at the time of streaming in an IP network).

In the aforementioned embodiments, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above embodiments include various aspects of examples. Although all possible combinations for presenting the various aspects may not be described, those skilled in the art will appreciate that other combinations are possible. Accordingly, the present invention should be construed as including all other replacements, modifications, and changes which fall within the scope of the claims.

The invention claimed is:

1. A video decoding apparatus, comprising:
a parsing module configured to:
parse a slice header of a second picture that is a next picture of a decoded first picture; wherein the slice header of the second picture includes reference picture information indicating whether the decoded first picture is a reference picture,
mark the decoded first picture as a reference picture in a Decoded Picture Buffer (DPB),
determine whether the decoded first picture is a non-reference picture based on the reference picture information included in the slice header of the second picture,
mark the decoded first picture marked as a reference picture as a non-reference picture when the decoded first picture is a non-reference picture, and
parse a transmission unit header of a transmission unit for the first picture,
wherein the transmission unit header does not comprise flag information indicating whether the transmission unit for the first picture is a non-reference picture or a reference picture, and
wherein the transmission unit header comprises information identifying a layer.

2. A video encoding apparatus, comprising:
an encoding module configured to:
encode a first picture, a slice header of a second picture that is a next picture of the first picture, and a transmission unit header of a transmission unit for the first picture, and
generate a bitstream that includes the encoded first picture and the encoded slice header,
wherein the slice header of the second picture includes reference picture information indicating whether the first picture is a reference picture,
wherein the first picture is marked as a reference picture,
wherein the reference picture information included in the slice header of the second picture is encoded based on whether the first picture marked as a reference picture is a reference picture or a non-reference picture,
wherein the first picture marked as a reference picture is marked as a non-reference picture when the reference picture information indicates that the first picture is a non-reference picture;
wherein the transmission unit header does not comprise flag information indicating whether the transmission unit for the first picture is a non-reference picture or a reference picture, and
wherein the transmission unit header comprises information identifying a layer.

3. A non-transitory computable-readable medium for storing a bitstream that is decoded by a video decoding method, the method comprising:
parsing a slice header of a second picture which is a next picture of a decoded first picture, wherein the slice header of the second picture includes reference picture information indicating whether the decoded first picture is a reference picture,
marking the decoded first picture as a reference picture in a Decoded Picture Buffer (DPB),
determining whether the decoded first picture is a non-reference picture based on the reference picture information included in the slice header of the second picture,
marking the decoded first picture marked as a reference picture as a non-reference picture when the decoded first picture is a non-reference picture,
parsing a transmission unit header of a transmission unit for the first picture,
wherein the transmission unit header does not comprise flag information indicating whether the transmission unit for the first picture is a non-reference picture or a reference picture, and wherein the transmission unit header comprises information identifying a layer.

* * * * *